US012687882B2

(12) United States Patent
    Brox

(10) Patent No.: US 12,687,882 B2
(45) Date of Patent: Jul. 21, 2026

(54) LATENCY SYNCHRONIZATION

(71) Applicant: Micron Technology, Inc., Boise, ID (US)

(72) Inventor: Martin Brox, Munich (DE)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 18/659,991

(22) Filed: May 9, 2024

(65) Prior Publication Data

US 2024/0385645 A1 Nov. 21, 2024

Related U.S. Application Data

(60) Provisional application No. 63/502,178, filed on May 15, 2023.

(51) Int. Cl.
    *G06F 1/12* (2006.01)

(52) U.S. Cl.
    CPC ..................................... *G06F 1/12* (2013.01)

(58) Field of Classification Search
    CPC .......... G06F 1/12; G06F 1/3275; G06F 1/325; G11C 7/222
    See application file for complete search history.

(56) References Cited

U.S. PATENT DOCUMENTS

| 6,188,640 B1 * | 2/2001 | Aikawa ................... | G11C 7/106 365/201 |
| 8,826,057 B1 * | 9/2014 | Chin .................... | G06F 13/4054 713/400 |
| 11,004,499 B1 * | 5/2021 | Kim ......................... | G11C 7/222 |
| 2002/0093871 A1 * | 7/2002 | Kwak ................... | G11C 7/1072 365/233.1 |
| 2006/0039232 A1 * | 2/2006 | Choi .................... | G11C 11/4076 365/194 |
| 2007/0147167 A1 * | 6/2007 | Chu ...................... | G11C 7/1051 365/233.16 |
| 2008/0192563 A1 * | 8/2008 | Cho .......................... | G11C 7/22 365/233.17 |
| 2014/0015575 A1 * | 1/2014 | Jung ....................... | H03L 7/081 327/156 |

* cited by examiner

*Primary Examiner* — Raymond N Phan
(74) *Attorney, Agent, or Firm* — Holland & Hart LLP

(57) ABSTRACT

Methods, systems, and devices for latency synchronization are described. A memory device may receive a data clock signal having a first rate and may generate a second clock signal having a second rate based on the data clock signal. A sampler may sample a first command signal indicating a command, where the second clock signal includes a first delay. A synchronizer may receive a second command signal from the sampler and a third clock signal from the sampler, where the second command signal and the third clock signal include a second delay. The synchronizer may synchronize a first timing of the second clock signal with a second timing of the third clock signal based on receiving the second command signal and the third clock signal and may output a signal including the second command signal and a synchronized clock signal having the second rate based on the synchronization.

20 Claims, 5 Drawing Sheets

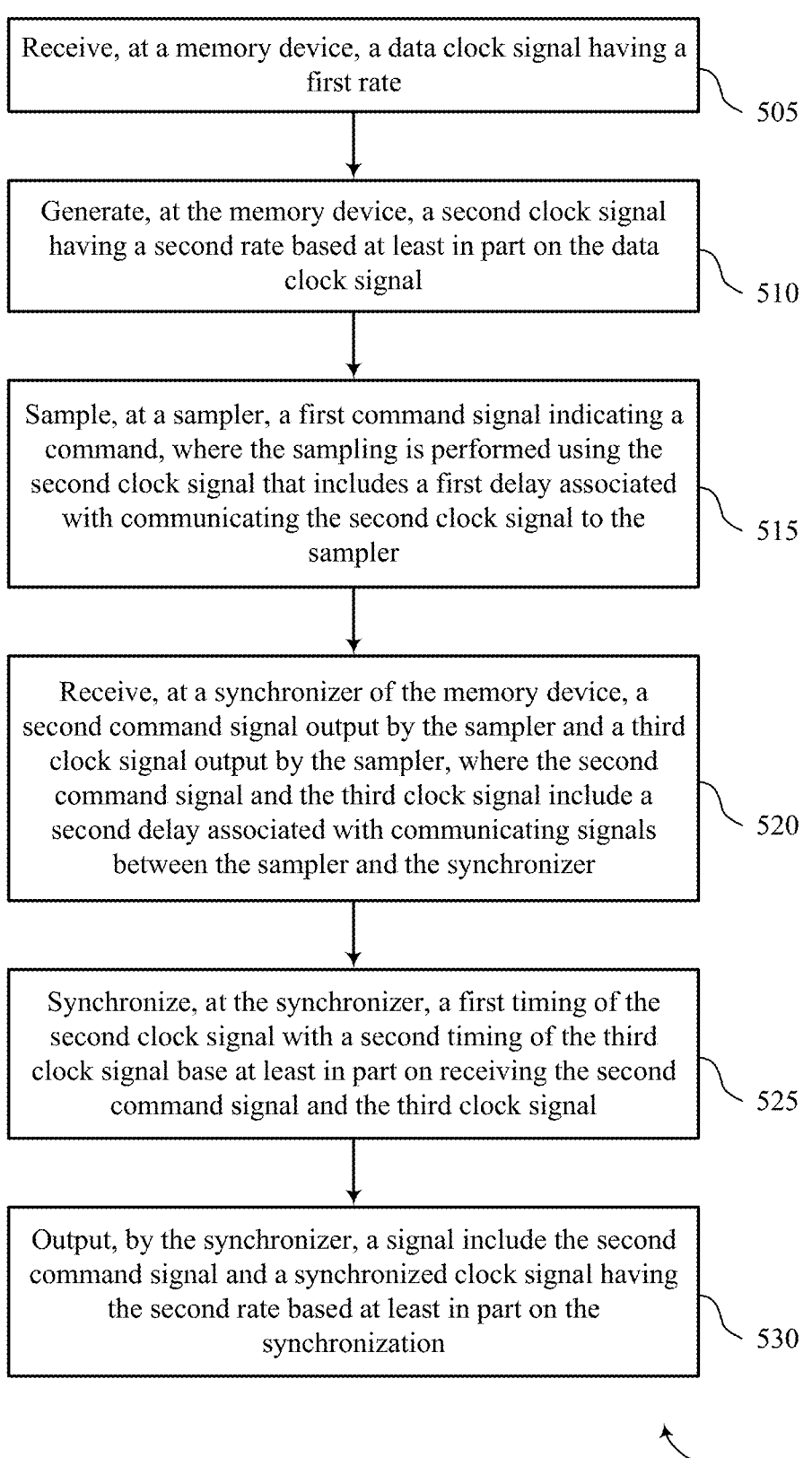

Receive, at a memory device, a data clock signal having a first rate

505

Generate, at the memory device, a second clock signal having a second rate based at least in part on the data clock signal

510

Sample, at a sampler, a first command signal indicating a command, where the sampling is performed using the second clock signal that includes a first delay associated with communicating the second clock signal to the sampler

515

Receive, at a synchronizer of the memory device, a second command signal output by the sampler and a third clock signal output by the sampler, where the second command signal and the third clock signal include a second delay associated with communicating signals between the sampler and the synchronizer

520

Synchronize, at the synchronizer, a first timing of the second clock signal with a second timing of the third clock signal base at least in part on receiving the second command signal and the third clock signal

525

Output, by the synchronizer, a signal include the second command signal and a synchronized clock signal having the second rate based at least in part on the synchronization

LATENCY SYNCHRONIZATION

CROSS REFERENCE

The present Application for Patent claims priority to U.S. Patent Application No. 63/502,178 by Martin Brox, entitled "LATENCY SYNCHRONIZATION," filed May 15, 2023, which is assigned to the assignee hereof, and which is expressly incorporated by reference in its entirety herein.

TECHNICAL FIELD

The following relates to one or more systems for memory, including latency synchronization.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells in a non-volatile configuration may maintain stored logic states for extended periods of time even in the absence of an external power source. Memory cells in a volatile configuration may lose stored states when disconnected from an external power source.

BRIEF DESCRIPTION OF THE DRAWINGS

FIG. 5 shows a flowchart illustrating a method or methods that support latency synchronization in accordance with examples as disclosed herein.

DETAILED DESCRIPTION

Figure 1:
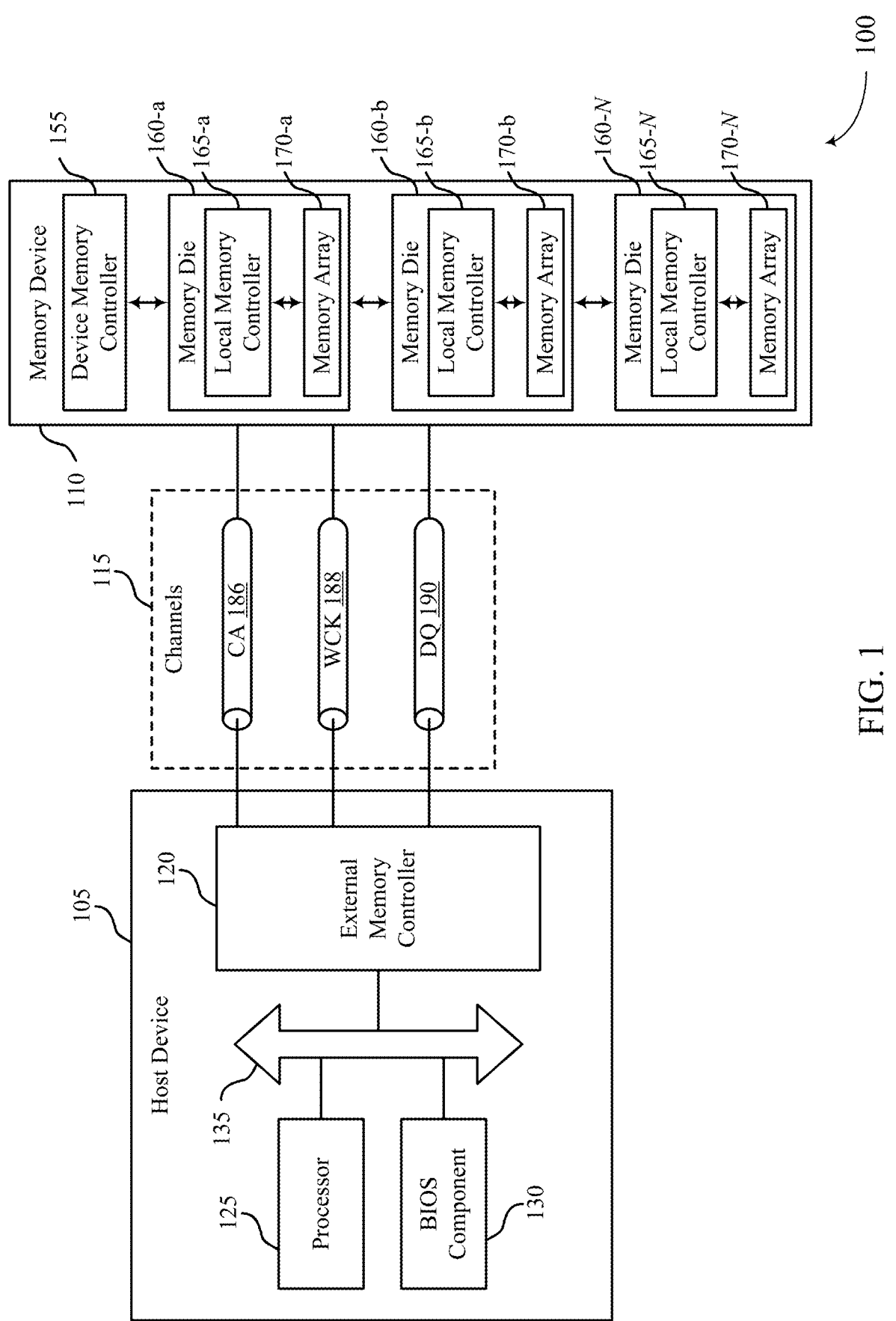
FIG. 1 shows an example of a system that supports latency synchronization in accordance with examples as disclosed herein.

In some examples, a memory device (e.g., a dynamic random access memory (DRAM) device) may be coupled with multiple external clock sources. For instance, the memory device may be coupled with a first clock source that may provide a timing reference (e.g., a write clock (WCK) signal) for data signals and a second clock source that may provide a timing reference (e.g., a clock (CK) signal) for command signals (e.g., command/address (CA) signals). In such examples, the channels for communicating data may use a different clock rate than the channels used to communicate commands/addresses. Examples that use a single clock as a timing reference (e.g., a WCK signal) for both data signals and command signals may be associated with a reduced system size, as a system including a memory device and a single clock signal may be smaller (e.g., use fewer pins between the host device and the memory device) than a system including a memory device and multiple clock sources. Additionally or alternatively, using the single clock may enable the system to avoid experiencing latency associated with performing synchronization between the multiple clocks (e.g., when exiting power-up, when exiting sleep, when exiting standby). However, a frequency used for timing command signals may be different from that used for timing data signals. It may be beneficial for the command/address signals to use a lower frequency than data signals to increase the reliability of the command/address signals and because the throughput used for command/address signals is less than the throughput used for data signals. For instance, using a same frequency timing reference for command signals and timing data signals may result in more unreliable command signals being sent to a controller of a memory array (e.g., more errors in the command/address signal).

The present disclosure may describe techniques for enabling command signals to be communicated using a different frequency than the data signals and synchronized with the data clock signal. For instance, a frequency of the data clock signal may be divided by a factor (e.g., a factor of 4) to generate a second clock signal whose frequency aligns with an expected frequency for command signals. The second clock signal may experience a first delay to arrive at a sampler for command signals, a second delay to pass through the sampler, and a third delay to arrive at a synchronizer. The synchronizer may synchronize command signals received from the sampler with a non-delayed version of the second signal and may output the synchronized command signal to data input/output (I/O) pins. The present disclosure may also describe techniques for enabling reset commands to be used to reset input and output counters at the synchronizer and/or techniques for selectively powering down the synchronizer to conserve power in certain scenarios (e.g., when each memory bank of a set of memory banks is closed).

Features of the disclosure are illustrated and described in the context of systems. Features of the disclosure are further illustrated and described in the context of synchronization circuits and flowcharts.

FIG. 1 shows an example of a system 100 that supports latency synchronization in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, a write clock signal (WCK) channel 188 (sometimes referred to as a data clock signal), one or more data (DQ) channels 190, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data.

In some examples, a CA channel 186 may include any quantity of signal paths (e.g., eight or nine signal paths) to communicate control information (e.g., commands or addresses).

In some examples, the WCK channel 188 may be operable to communicate a data clock signal between the host device 105 and the memory device 110. Clock signals (e.g., data clock signals) may be operable to oscillate between a high state and a low state, and may support coordination (e.g., in time) between actions of the host device 105 and the memory device 110. In some examples, the data clock signal may be single ended. In some examples, the data clock signal may provide a timing reference for data operations as well as command and addressing operations for the memory device 110, or other system-wide operations for the memory device 110. The data clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

In addition to applicability in memory systems as described herein, techniques for a method of latency synchronization may be generally implemented to improve the performance (including gaming) of various electronic devices and systems. Some electronic device applications, including gaming and other high-performance applications, may be associated with relatively high processing constraints while also benefitting from relatively quick response times to improve user experience. As such, increasing processing speed, decreasing response times, or otherwise improving the performance electronic devices may be desirable. Implementing the techniques described herein may improve the performance of electronic devices by decreasing latency times associated with performing synchronization between multiple clocks, among other benefits.

In some examples, a memory device 110 may be coupled with an external clock source. For instance, the memory device 110 may be coupled with a first, data clock source that may provide a timing reference (e.g., a write clock signal, such as from channel 188) for data signals. In some examples, a second clock source may provide a timing reference (e.g., a clock signal) for command signals (e.g., C/A signals). Examples of systems that use a single clock as a timing reference (e.g., a WCK signal) for both data signals and command signals may be associated with a reduced system size, as a system including a memory device and a single clock source may be smaller than a system including a memory device and multiple clock sources. Additionally or alternatively, using the single clock may enable the system to avoid experiencing latency associated with performing synchronization between the multiple clocks (e.g., when exiting power-up, when exiting sleep, when exiting standby). However, a frequency used for timing command signals may be different from that used for timing data signals. For instance, using a same frequency timing reference for command signals and timing data signals may result in invalid command signals being sent to a controller of a memory array (e.g., one or more of local memory controllers 165-a through 165-N). Additionally, a source of the data clock may be located closer to circuitry associated with processing data signals as compared to circuitry associated with processing command signals (e.g., a sampler). Such a difference in location may result in delays in the arrival of the data clock signal to the circuitry for processing command signals such that command signals sent to a controller of a memory array may not be in sync with the data signal and/or the data clock signal sent to the controller of the memory array (e.g., one or more of local memory controllers 165-a through 165-N).

The present disclosure may describe techniques for enabling command signals to be synchronized with the write clock signal for use by a controller of a memory array (e.g., one or more of local memory controllers 165-a through 165-N). For instance, a frequency of the data clock signal may be divided by a factor (e.g., a factor of 4) to generate a second clock signal whose frequency aligns with an expected frequency for command signals. The second clock signal may experience a first delay to arrive at a sampler (e.g., a sampler of device memory controller 155) for command signals, a second delay to pass through the sampler, and a third delay to arrive at a synchronizer. The synchronizer may synchronize command signals received from the sampler with a non-delayed version of the second signal and may output the synchronized command signal to data I/O pins. The present disclosure may also describe techniques for enabling reset commands to be used to reset input and output counters at the synchronizer and/or techniques for selectively powering down the synchronizer to conserve power in certain scenarios (e.g., when each memory bank of a set of memory banks is closed).

Figure 2:
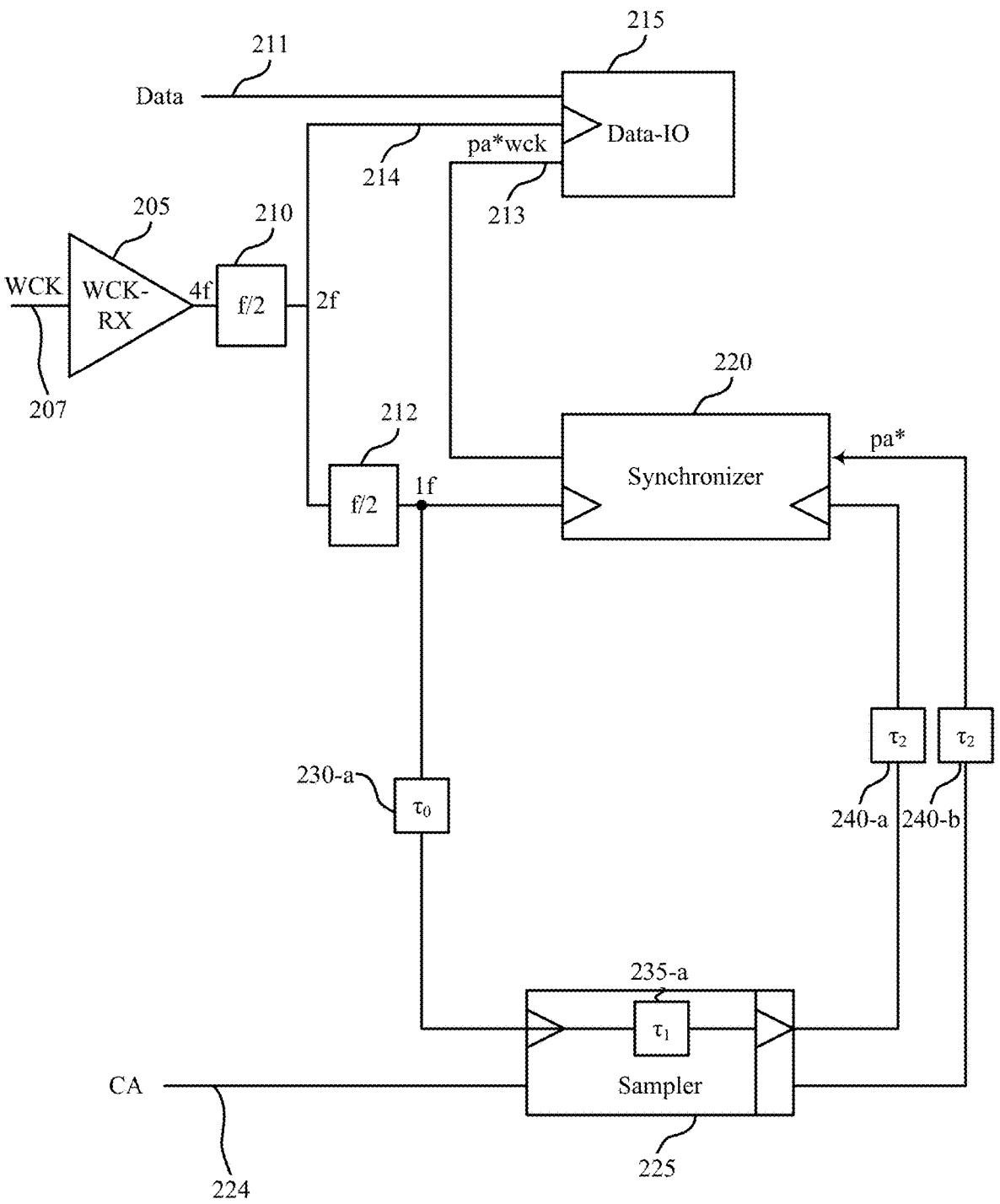
FIG. 2 shows an example of a circuit that supports latency synchronization in accordance with examples as disclosed herein.

FIG. 2 shows an example of a circuit 200 that supports methods latency synchronization in accordance with examples as disclosed herein. In some examples, circuit 200 may be implemented by one or more aspects of FIG. 1. For instance, data pathway 211 may be an example of or may be coupled with data channel 190; WCK pathway 214 may be an example of or may be coupled with WCK channel 188; and CA channel 224 may be an example of or may be coupled with CA channel 186. In some examples, the circuit 200 may be included in a memory device.

In some examples, circuit 200 may illustrate an example of how a data clock signal (e.g., WCK) produced by a data clock may be used as a timing reference for command signals. For instance, a data clock signal may be received over WCK channel 207 by WCK receiver 205, where the data clock signal may have a first rate (e.g., a first clock speed in terms of Hertz (Hz)). In some examples, the data clock signal may be altered to a different frequency using any quantity of circuits or step-down stages. For instance, the WCK receiver 205 may provide the received data clock signal to frequency converter 210, which may be configured to adjust a frequency of the data clock signal by a first factor (e.g., may divide the frequency by a factor of 2). Frequency converter 210 may provide the adjusted data clock signal to frequency converter 212 and data-IO 215 (e.g., along WCK pathway 214). Frequency converter 212, upon receiving the adjusted data clock signal may adjust the frequency of the adjusted data clock signal by a second factor (e.g., may divide the frequency by a factor of 2) to generate a second clock signal having a second rate (e.g., a second clock speed in terms of Hz that is smaller than the first rate). In some examples, the second clock signal may have a frequency that is 4 times smaller than that of the data clock signal received over WCK channel 207.

After generating the second clock signal, the frequency converter 212 may output the second clock signal to sampler 225 and synchronizer 220. On the way to sampler 225, the second clock signal may experience a delay 230-a (i.e., $\tau_0$) associated with communicating the second clock signal to sampler 225, which may be due at least in part due to a length of the conductive channel between the frequency converter 212 and the sampler 225. The sampler 225 may perform sampling of a command signal indicating a command received over CA channel 224 using the second clock signal with the delay 230-a and may output a second command signal (i.e., pa*) generated from the sampling. From being input to the sampler 225 to being output from the sampler 225, the second clock signal may experience a delay 235-a (e.g., $\tau_1$), which may be referred to as a global control delay or a sampler delay, and may be output as a third clock signal. Delay 235-a may be associated with a second time duration between sampler 325 receiving the second clock signal to outputting the third clock signal. The third clock signal output by the sampler 225 may experience a delay 240-a (i.e., $\tau_2$) and the second command signal output by the sampler 225 may experience a delay 240-b (e.g., also $\tau_2$) associated with communicating signals between the sampler 225 and the synchronizer 220, which may be due at least in part due to a length of the conductive channel between the sampler 225 and the synchronizer 220. In some examples, sampler 225 may be an example of a controller (e.g., a central logical controller, a device memory controller 155 as described with reference to FIG. 1).

The delays in the clock signal (e.g., $\tau_0$, $\tau_1$, $\tau_2$) may cause the data signals to become misaligned from the associated command/address signals. A synchronizer may be useful to synchronize the command/address signals with the appropriate data signals received from a host device. For instance, synchronizer 220, upon receiving the second clock signal (e.g., from frequency converter 212), the third clock signal (e.g., from sampler 225), and the second command signal (e.g., from sampler 225), may synchronize the second command signal to the non-delayed version of the second clock signal and may output the synchronized second command signal (i.e., pa*wck) and/or a synchronized clock signal having the second rate over the command pathway 213. In some examples, the synchronizing may include synchronizing a first timing of the third clock signal (e.g., a delayed version of the second clock signal) with a second timing of the non-delayed version of the second clock signal. In some examples, the first timing of the second clock signal and the second timing of the third clock signal may differ by a time duration that is based on (e.g., that includes) delay 230-a and delay 240-a. Additionally, the time duration may be based on (e.g., that includes) delay 235-a. In some examples, the time duration may be defined as a sum total of delays 230-a, 235-a, and 240-a.

Data-IO 215 may receive data from data pathway 211, the adjusted data clock signal (e.g., divided by 2) from WCK pathway 214, and the synchronized second command signal (i.e., pa*wck) from synchronizer 220 and may deliver the data, the adjusted data clock signal, and the synchronized second command signal to a controller of a memory array (e.g., any of local memory controller 165-a through 165-N as described with reference to FIG. 1). In some examples, synchronizer 220 may be an example of a FIFO-based latency synchronizer (e.g., the synchronizer 220 may include an input FIFO buffer based on the third clock signal from sampler 325, an output FIFO buffer based on the non-delayed second clock signal from frequency converter 212, a set of FIFO cells, or any combination thereof).

In some examples, the synchronizer 220 may be powered down in one or more scenarios. Synchronizer 220 may be powered down whenever each of one or more memory banks (e.g., of a memory device 110, of a memory die 160-a) is not being used (e.g., closed). For instance, synchronizer 220 may be powered down when each memory bank of a memory device is detected to be closed (e.g., if no memory bank is activated, if no access operations are occurring on a memory bank, if no column activity is occurring or is not possible). By powering down in some such examples, a system (e.g., a memory system, memory device 110) may conserve power.

In some examples, the techniques described herein may be associated with one or more advantages. For instance, by using a single clock source (e.g., WCK) instead of multiple clock sources (e.g., CK and WCK), a system (e.g., a memory system, memory device 110) may have a reduced size and/or may avoid latency associated with synchronizing the multiple clock sources (e.g., when exiting power-up, when exiting sleep, when exiting standby). Additionally, by including the synchronizer 220, the second command signal may be synchronized regardless of delays experienced due to a distance between components of circuit 200 (e.g., between frequency converter 212 and sampler 225 and/or between sampler 225 and synchronizer 220).

Figure 3:
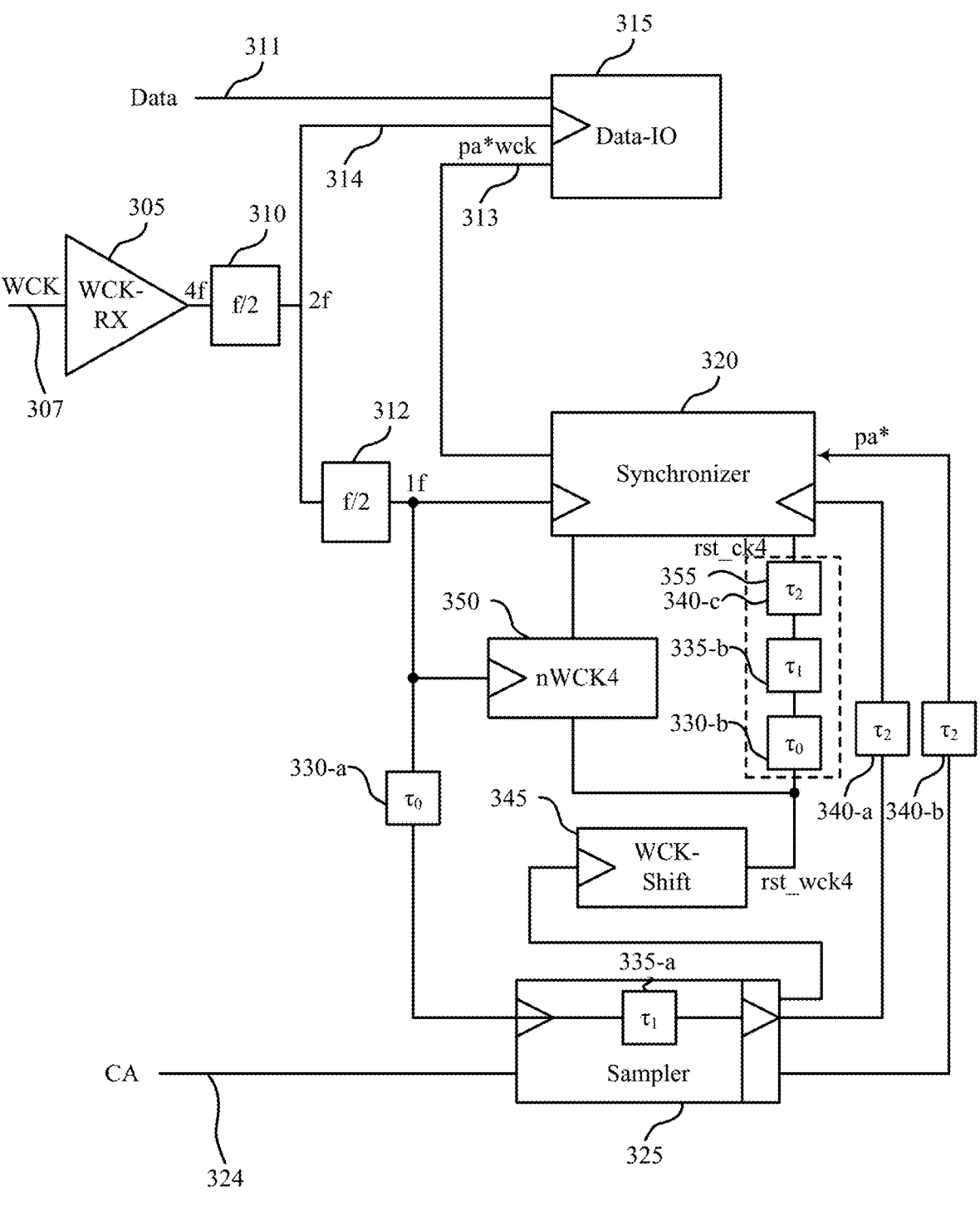
FIG. 3 shows an example of a circuit that supports latency synchronization in accordance with examples as disclosed herein.

FIG. 3 shows an example of a circuit 300 that supports methods of latency synchronization in accordance with examples as disclosed herein. In some examples, circuit 300 may be implemented by one or more aspects of FIG. 1. In some examples, data pathway 311 may be an example of or may be coupled with data channel 190; WCK pathway 314 may be an example of or may be coupled with WCK channel 188; and CA channel 324 may be an example of or may be coupled with CA channel 186. In some examples, the circuit 300 may be included in a memory device.

In some examples, circuit 300 may illustrate an example of how a data clock signal (e.g., WCK) produced by a data clock may be used as a timing reference for command signals. For instance, a data clock signal may be received over WCK channel 307 by WCK receiver 305, where the data clock signal may have a first rate (e.g., a first clock speed in terms of Hz). In some examples, the data clock signal may be altered to a different frequency using any quantity of circuits or step-down stages. For instance, WCK receiver 305 may provide the received data clock signal to frequency converter 310, which may be configured to adjust a frequency of the data clock signal by a first factor (e.g., may divide the frequency by a factor of 2). Frequency converter 310 may provide the adjusted data clock signal to frequency converter 312 and data-IO 315 (e.g., along WCK pathway 314). Frequency converter 312, upon receiving the adjusted data clock signal may adjust the frequency of the adjusted data clock signal by a second factor (e.g., may divide the frequency by a factor of 2) to generate a second clock signal at a second rate (e.g., a second clock speed in terms of Hz that is smaller than the first rate). In some examples, the second clock signal may have a frequency that is 4 times smaller than that of the data clock signal received over WCK channel 307.

After generating the second clock signal, the frequency converter 312 may output the second clock signal to sampler 325 and synchronizer 320. On the way to sampler 325, the second clock signal may experience a delay 330-a (i.e., $\tau_0$) associated with communicating the second clock signal to sampler 325, which may be due at least in part due to a length of the conductive channel between the frequency converter 312 and the sampler 325. The sampler 325 may perform sampling of a command signal indicating a command received over CA channel 324 using the second clock signal with the delay 330-a and may output a second command signal (i.e., pa*) generated from the sampling. From being input to the sampler 325 to being output from the sampler 325, the second clock signal may experience a delay 335-a (e.g., $\tau_1$), which may be referred to as a global-control delay or a sampler delay, and may be output as a third clock signal. Delay 335-a may be associated with a second time duration between sampler 325 receiving the second clock signal to outputting the third clock signal. The third clock signal output by the sampler 325 may experience a delay 340-a (i.e., $\tau_2$) and the second command signal output by the sampler 325 may experience a delay 340-b (e.g., also $\tau_2$) associated with communicating signals between the sampler 325 and the synchronizer 320, which may be due at least in part due to a length of the conductive channel between the sampler 325 and the synchronizer 320. In some examples, sampler 325 may be an example of a controller (e.g., a central logical controller, a device memory controller 155 as described with reference to FIG. 1).

The delays in the third clock signal (e.g., $\tau_0$, $\tau_1$, $\tau_2$) relative to the second clock signal output at the frequency converter 312 may cause the data signals to become misaligned from the associated command/address signals. A synchronizer may be useful to synchronize the command/address signals with the appropriate data signals received from a host device. For instance, synchronizer 320, upon receiving the non-delayed version of the second clock signal (e.g., from frequency converter 312), the third clock signal (e.g., from sampler 325), and the second command signal (e.g., from sampler 325), may synchronize the second command signal to the non-delayed version of the second clock signal and may output the synchronized second command signal (i.e., pa*wck) and/or a synchronized clock signal having the second rate over the command pathway 313. In some examples, the synchronizing may include synchronizing a first timing of the third clock signal (e.g., a delayed version of the second clock signal) with a second timing of the non-delayed version of the second clock signal. In some examples, the first timing of the second clock signal and the second timing of the third clock signal may differ by a time duration that is based on (e.g., that includes) delay 330-a and delay 340-a. Additionally, the time duration may be based on (e.g., that includes) delay 335-a. In some examples, the time duration may be defined as a sum total of delays 330-a, 335-a, and 340-a.

Data-IO 315 may receive data from data pathway 311, the adjusted data clock signal (e.g., divided by 2) from WCK pathway 314, and the synchronized second command signal (i.e., pa*wck) from synchronizer 320 and may deliver the data, the adjusted data clock signal, and the synchronized second command signal to a controller of a memory array (e.g., any of local memory controller 165-a through 165-N as described with reference to FIG. 1). In some examples, synchronizer 320 may be an example of a FIFO-based latency synchronizer (e.g., the synchronizer 320 may include an input FIFO buffer based on the third clock signal from sampler 325, an output FIFO buffer based on the non-delayed second clock signal from frequency converter 312, a set of FIFO cells, or any combination thereof).

In some examples, the synchronizer 320 may be powered down in one or more scenarios. Synchronizer 320 may be powered down whenever each of one or more memory banks (e.g., of a memory device 110, of a memory die 160-*a*) is not being used (e.g., is closed). For instance, synchronizer 320 may be powered down when each memory bank of a memory device 110 is detected to be closed (e.g., if no memory bank is activated, if no access operations are occurring on a memory bank, if no column activity is occurring or is not possible). By powering down in some such examples, a system (e.g., a memory system, memory device 110) may conserve power.

In some examples, circuit 300 may generate a reset event (e.g., may employ a synchronizer reset mechanism that may be based on a round trip-delay) on a first clock domain (e.g., the CK4 domain) and may capture the reset event on a second clock domain (e.g., the WCK4 domain). The sampler 325 may generate a reset request (e.g., a first reset command signal) on a first clock domain of the sampler 325 (i.e., the CK4 domain) and may output the reset request to WCK-shift component 345 (e.g., a flip-flop, a set of multi-stage flip-flops). For instance, the sampler 325, which may be an example of a controller, may issue a reset request command to WCK-shift component 345, which the WCK-shift component 345 may receive. WCK-shift component 345 may shift the reset request from the first clock domain to a second clock domain associated with the second clock signal output by frequency converter 212 (i.e., the WCK4 domain) and may generate and output a second reset command signal (i.e., rst_wck4) based on the first reset command signal. Additionally, the WCK-shift component 345 may provide stability protection (e.g., meta-stability protection).

The WCK-shift component 345 may output rst_wck4 to nWCK4 component 350 and delay component 355. nWCK4 component 350 may provide the second reset command signal (e.g., rst_wck4) to a first input of the synchronizer 320 (e.g., an output counter of synchronizer 320) and may receive the second clock signal (e.g., the signal of the WCK4 clock domain) from frequency converter 312 as an input. In some examples, the nWCK4 component 350 may delay rst_wck4 by some quantity of clock cycles. Once the output counter of the synchronizer 320 receives rst_wck4, the output counter may reset. Delay component 355 may replicate a flight time of delays 330-*a*, 335-*a*, and 340-*a*. For instance, delay component 355 may apply delays 330-*b* (e.g., $\tau_0$), 335-*b* (e.g., $\tau_1$), and 340-*c* (e.g., $\tau_2$) to rst_wck4 to generate a delayed version of rst_wck4 (i.e., rst_ck4) that includes delays 330-*b*, 335-*b*, and 340-*c*. In some examples, delay 335-*b* may be associated with a time duration between sampler 325 receiving the second clock signal and outputting the third clock signal. Delay component 355 may then output rst_ck4 (e.g., the delayed version of the second reset command signal) to a second input of the synchronizer 320 (e.g., to an input counter). The input counter of synchronizer 320 may reset upon receiving rst_ck4. In some examples, rst_ck4 may be used to start an input FIFO of synchronizer 320, where rst_ck4 may be synchronous with an input clock of synchronizer 320 (e.g., the third clock signal received from the sampler 325). In some examples, rst_wck4 may be used to start an output FIFO of synchronizer 320, where rst_wck4 may be synchronous to an output clock of synchronizer 320 (e.g., the non-delayed version of the second clock signal received from frequency converter 312). In some examples, a time for resetting and/or restarting the synchronizer 320 may be below a threshold amount (e.g., the time for resetting and/or restarting the synchronizer 320 may be equal to $\tau_0+\tau_1+\tau_2$, which may be less than 5 nanoseconds).

In some examples, the techniques described herein may be associated with one or more advantages. For instance, by using a single clock source (e.g., WCK) instead of multiple clock sources (e.g., CK and WCK), a system (e.g., a memory system, memory device 110) may have a reduced size and/or may avoid latency associated with synchronizing the multiple clock sources e.g., when exiting power-up, when exiting sleep, when exiting standby). Additionally, by including the synchronizer 320, the second command signal may be synchronized regardless of delays experienced due to a distance between components of circuit 300 (e.g., between frequency converter 312 and sampler 325 and/or between sampler 325 and synchronizer 320).

Figure 4:
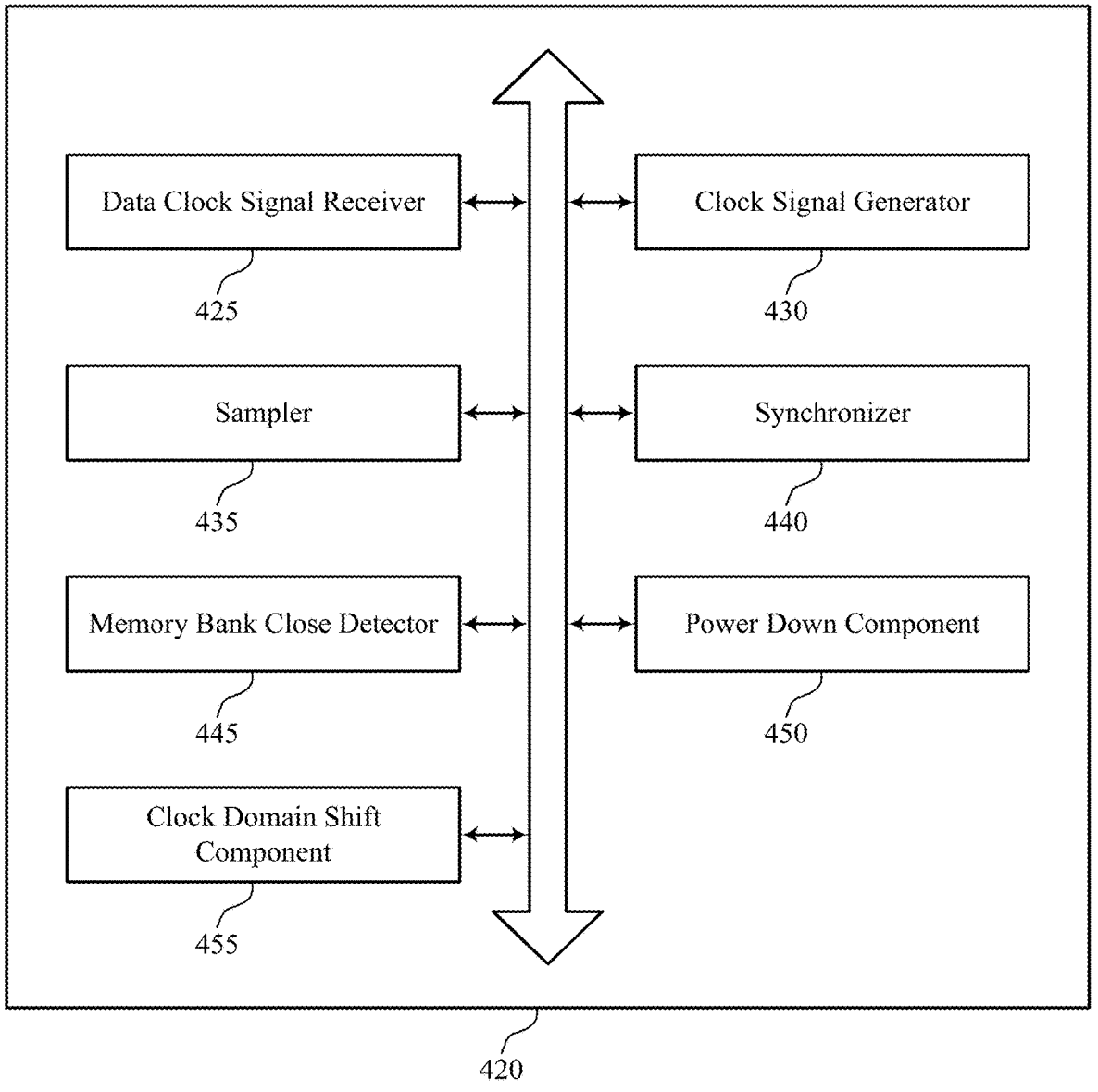
FIG. 4 shows a block diagram of a memory device that supports latency synchronization in accordance with examples as disclosed herein.

FIG. 4 shows a block diagram 400 of a memory device 420 that supports latency synchronization in accordance with examples as disclosed herein. The memory device 420 may be an example of aspects of a memory device as described with reference to FIGS. 1 through 3. The memory device 420, or various components thereof, may be an example of means for performing various aspects of latency synchronization as described herein. For example, the memory device 420 may include a data clock signal receiver 425, a clock signal generator 430, a sampler 435, a synchronizer 440, a memory bank close detector 445, a power down component 450, a clock domain shift component 455, or any combination thereof. Each of these components may communicate, directly or indirectly, with one another (e.g., via one or more buses).

The data clock signal receiver 425 may be configured as or otherwise support a means for receiving, at a memory device, a data clock signal having a first rate. The clock signal generator 430 may be configured as or otherwise support a means for generating, at the memory device, a second clock signal having a second rate based at least in part on the data clock signal. The sampler 435 may be configured as or otherwise support a means for sampling, at a sampler, a first command signal indicating a command, where the sampling is performed using the second clock signal that includes a first delay associated with communicating the second clock signal to the sampler. The synchronizer 440 may be configured as or otherwise support a means for receiving, at a synchronizer of the memory device, a second command signal output by the sampler and a third clock signal output by the sampler, where the second command signal and the third clock signal include a second delay associated with communicating signals between the sampler and the synchronizer. In some examples, the synchronizer 440 may be configured as or otherwise support a means for synchronizing, at the synchronizer, a first timing of the second clock signal with a second timing of the third clock signal based at least in part on receiving the second command signal and the third clock signal. In some examples, the synchronizer 440 may be configured as or otherwise support a means for outputting, by the synchronizer, a signal including the second command signal and a synchronized clock signal having the second rate based at least in part on the synchronization.

In some examples, the synchronizer 440 may be configured as or otherwise support a means for receiving, at a first input of the synchronizer, a first reset command signal. In some examples, the synchronizer 440 may be configured as or otherwise support a means for resetting an output counter of the synchronizer based at least in part on receiving the first reset command signal at the first input. In some examples, the synchronizer 440 may be configured as or otherwise support a means for receiving, at a second input of the synchronizer, the first reset command signal, where the first reset command signal at the second input includes at least the first delay and the second delay relative to the first reset command signal at the first input. In some examples, the synchronizer 440 may be configured as or otherwise support a means for resetting an input counter of the synchronizer based at least in part on receiving the first reset command signal at the second input.

In some examples, the sampler 435 may be configured as or otherwise support a means for generating, at the sampler, a second reset command signal. In some examples, the clock domain shift component 455 may be configured as or otherwise support a means for receiving, at a flip-flop of the memory device and from the sampler, the second reset command signal. In some examples, the clock domain shift component 455 may be configured as or otherwise support a means for generating, at the flip-flop, the first reset command signal based at least in part on the second reset command signal, where receiving the first reset command signal and the first input of the synchronizer and the second input of the synchronizer is based at least in part on generating the first reset command signal at the flip-flop.

In some examples, the first reset command signal at the second input further includes a third delay relative to the first reset command signal at the first input. In some examples, the third delay is associated a time duration between the sampler receiving the second clock signal and outputting the third clock signal.

In some examples, the memory bank close detector 445 may be configured as or otherwise support a means for detecting that each memory bank associated with the memory device is closed. In some examples, the power down component 450 may be configured as or otherwise support a means for powering down the synchronizer based at least in part on the detecting.

In some examples, the first timing of the second clock signal and the second timing of the third clock signal differ by a time duration that is based at least in part on the first delay and the second delay.

In some examples, the time duration is further based at least in part on a third delay. In some examples, the third delay is associated a second time duration between the sampler receiving the second clock signal and outputting the third clock signal.

In some examples, the described functionality of the memory device 420, or various components thereof, may be supported by or may refer to at least a portion of a processor, where such a processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory device 420, or various components thereof, may be implemented at least in part by instructions (e.g., stored in memory, non-transitory computer-readable medium) executable by such a processor.

FIG. 5 shows a flowchart illustrating a method 500 that supports latency synchronization in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally, or alternatively, the memory device may perform aspects of the described functions using special-purpose hardware.

At 505, the method may include receiving, at a memory device, a data clock signal having a first rate. In some examples, aspects of the operations of 505 may be performed by a data clock signal receiver 425 as described with reference to FIG. 4.

At 510, the method may include generating, at the memory device, a second clock signal having a second rate based at least in part on the data clock signal. In some examples, aspects of the operations of 510 may be performed by a clock signal generator 430 as described with reference to FIG. 4.

At 515, the method may include sampling, at a sampler, a first command signal indicating a command, where the sampling is performed using the second clock signal that includes a first delay associated with communicating the second clock signal to the sampler. In some examples, aspects of the operations of 515 may be performed by a sampler 435 as described with reference to FIG. 4.

At 520, the method may include receiving, at a synchronizer of the memory device, a second command signal output by the sampler and a third clock signal output by the sampler, where the second command signal and the third clock signal include a second delay associated with communicating signals between the sampler and the synchronizer. In some examples, aspects of the operations of 520 may be performed by a synchronizer 440 as described with reference to FIG. 4.

At 525, the method may include synchronizing, at the synchronizer, a first timing of the second clock signal with a second timing of the third clock signal based at least in part on receiving the second command signal and the third clock signal. In some examples, aspects of the operations of 525 may be performed by a synchronizer 440 as described with reference to FIG. 4.

At 530, the method may include outputting, by the synchronizer, a signal including the second command signal and a synchronized clock signal having the second rate based at least in part on the synchronization. In some examples, aspects of the operations of 530 may be performed by a synchronizer 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device, a data clock signal having a first rate; generating, at the memory device, a second clock signal having a second rate based at least in part on the data clock signal; sampling, at a sampler, a first command signal indicating a command, where the sampling is performed using the second clock signal that includes a first delay associated with communicating the second clock signal to the sampler; receiving, at a synchronizer of the memory device, a second command signal output by the sampler and a third clock signal output by the sampler, where the second command signal and the third clock signal include a second delay associated with communicating signals between the sampler and the synchronizer; synchronizing, at the synchronizer, a first timing of the second clock signal with a second timing of the third clock signal based at least in part on receiving the second command signal and the third clock signal; and outputting, by the synchronizer, a signal including the second command signal and a synchronized clock signal having the second rate based at least in part on the synchronization.

Aspect 2: The method, apparatus, or non-transitory computer-readable medium of aspect 1, further including operations, features, circuitry, logic, means, or instructions, or any combination thereof for receiving, at a first input of the synchronizer, a first reset command signal; resetting an output counter of the synchronizer based at least in part on receiving the first reset command signal at the first input; receiving, at a second input of the synchronizer, the first reset command signal, where the first reset command signal at the second input includes at least the first delay and the second delay relative to the first reset command signal at the first input; and resetting an input counter of the synchronizer based at least in part on receiving the first reset command signal at the second input.

Aspect 3: The method, apparatus, or non-transitory computer-readable medium of aspect 2, further including operations, features, circuitry, logic, means, or instructions, or any combination thereof for generating, at the sampler, a second reset command signal; receiving, at a flip-flop of the memory device and from the sampler, the second reset command signal; and generating, at the flip-flop, the first reset command signal based at least in part on the second reset command signal, where receiving the first reset command signal and the first input of the synchronizer and the second input of the synchronizer is based at least in part on generating the first reset command signal at the flip-flop.

Aspect 4: The method, apparatus, or non-transitory computer-readable medium of any of aspects 2 through 3, where the first reset command signal at the second input further includes a third delay relative to the first reset command signal at the first input and the third delay is associated a time duration between the sampler receiving the second clock signal and outputting the third clock signal.

Aspect 5: The method, apparatus, or non-transitory computer-readable medium of any of aspects 1 through 4, further including operations, features, circuitry, logic, means, or instructions, or any combination thereof for detecting that each memory bank associated with the memory device is closed and powering down the synchronizer based at least in part on the detecting.

Aspect 6: The method, apparatus, or non-transitory computer-readable medium of any of aspects 1 through 5, where the first timing of the second clock signal and the second timing of the third clock signal differ by a time duration that is based at least in part on the first delay and the second delay.

Aspect 7: The method, apparatus, or non-transitory computer-readable medium of aspect 6, where the time duration is further based at least in part on a third delay and the third delay is associated a second time duration between the sampler receiving the second clock signal and outputting the third clock signal.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 8: An apparatus, including: a receiver configured to receive a data clock signal having a first rate and to generate a second clock signal having a second rate based at least in part on the data clock signal; a sampler configured to sample a first command/address signal, where the sampler is configured to perform the sampling using the second clock signal that includes a first delay associated with communicating the second clock signal to the sampler; and a synchronizer configured to: receive a second command/address signal output by the sampler and a third clock signal output by the sampler, where the second command/address signal and the third clock signal include a second delay associated with communicating signals between the sampler and the synchronizer; synchronize a first timing of the second clock signal with a second timing of the third clock signal based at least in part on receiving the second command/address signal and the third clock signal; and output a signal including the second command/address signal and a synchronized clock signal having the second rate based at least in part on the synchronization.

Aspect 9: The apparatus of aspect 8, where the synchronizer is configured to receive a first reset command signal at a first input of the synchronizer and to receive the first reset command signal at a second input of the synchronizer, where the first reset command signal at the second input includes at least the first delay and the second delay relative to the first reset command signal at the first input, the synchronizer including: an output counter configured to be reset based at least in part on the synchronizer receiving the first reset command signal at the first input; and an input counter of the synchronizer configured to be reset based at least in part on receiving the first reset command signal at the second input.

Aspect 10: The apparatus of aspect 9, where the apparatus further including: a flip-flop configured to receive a second reset command signal from the sampler and to generate the first reset command signal based at least in part on the second reset command signal, where the synchronizer is configured to receive the first reset command signal at the first input and the second input based at least in part on the sampler generating the first reset command signal.

Aspect 11: The apparatus of any of aspects 9 through 10, where the first reset command signal at the second input further includes a third delay relative to the first reset command signal at the first input, the third delay is associated a time duration between the sampler receiving the second clock signal and outputting the third clock signal.

Aspect 12: The apparatus of any of aspects 8 through 11, where the apparatus is further configured to: detect that each memory bank is closed; and power down the synchronizer based at least in part on the detecting.

Aspect 13: The apparatus of any of aspects 8 through 12, where the first timing of the second clock signal and the second timing of the third clock signal differ by a time duration based at least in part on the first delay and the second delay.

Aspect 14: The apparatus of aspect 13, where the time duration is further based at least in part on a third delay, the third delay is associated a second time duration between the sampler receiving the second clock signal and outputting the third clock signal.

An apparatus is described. The following provides an overview of aspects of the apparatus as described herein:

Aspect 15: A memory device, including: a synchronizer configured to: receive a second clock signal having a second rate based at least in part on a data clock signal that has a first rate; receive a command signal output by a sampler and a third clock signal output by the sampler, where the command signal and the third clock signal include a delay associated with communicating signals between the sampler and the synchronizer; synchronize a first timing of the second clock signal with a second timing of the third clock signal based at least in part on receiving the command signal and the third clock signal; and output a signal including the command signal and a synchronized clock signal having the second rate based at least in part on the synchronization.

Aspect 16: The memory device of aspect 15, where the synchronizer is further configured to: receive, at a first input of the synchronizer, a first reset command signal; reset an output counter of the synchronizer based at least in part on receiving the first reset command signal at the first input; receive, at a second input of the synchronizer, the first reset command signal, where the first reset command signal at the second input includes at least the delay relative to the first reset command signal at the first input; and reset an input counter of the synchronizer based at least in part on receiving the first reset command signal at the second input.

Aspect 17: The memory device of aspect 16, where the first reset command signal at the second input further includes a second delay associated with communicating the second clock signal to the sampler and a third delay associated with a time duration between the sampler receiving the second clock signal and outputting the third clock signal.

Aspect 18: The memory device of any of aspects 15 through 17, where the synchronizer is further configured to: power down when each memory bank associated with the memory device is closed.

Aspect 19: The memory device of any of aspects 15 through 18, where the first timing of the second clock signal and the second timing of the third clock signal differ by a time duration based at least in part on the delay.

Aspect 20: The memory device of aspect 19, where the time duration is further based at least in part on a second delay associated with communicating the second clock signal to the sampler and a third delay associated with a second time duration between the sampler receiving the second clock signal and outputting the third clock signal.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial materials of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent each of the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving, at a memory device, a data clock signal having a first rate;

generating, at the memory device, a second clock signal having a second rate based at least in part on the data clock signal;

sampling, at a sampler, a first command signal indicating a command, wherein the sampling is performed using the second clock signal that includes a first delay associated with communicating the second clock signal to the sampler;

receiving, at a synchronizer of the memory device, a second command signal output by the sampler and a third clock signal output by the sampler, wherein the second command signal and the third clock signal include a second delay associated with communicating signals between the sampler and the synchronizer;

synchronizing, at the synchronizer, a first timing of the second clock signal with a second timing of the third clock signal based at least in part on receiving the second command signal and the third clock signal; and outputting, by the synchronizer, a signal comprising the second command signal and a synchronized clock signal having the second rate based at least in part on the synchronization.

2. The method of claim 1, further comprising:

receiving, at a first input of the synchronizer, a first reset command signal;

resetting an output counter of the synchronizer based at least in part on receiving the first reset command signal at the first input;

receiving, at a second input of the synchronizer, the first reset command signal, wherein the first reset command signal at the second input includes at least the first delay and the second delay relative to the first reset command signal at the first input; and resetting an input counter of the synchronizer based at least in part on receiving the first reset command signal at the second input.

3. The method of claim 1, further comprising:

detecting that each memory bank associated with the memory device is closed; and powering down the synchronizer based at least in part on the detecting.

4. The method of claim 1, wherein the first timing of the second clock signal and the second timing of the third clock signal differ by a time duration that is based at least in part on the first delay and the second delay.

5. The method of claim 2, further comprising:

generating, at the sampler, a second reset command signal;

receiving, at a flip-flop of the memory device and from the sampler, the second reset command signal; and generating, at the flip-flop, the first reset command signal based at least in part on the second reset command signal, wherein receiving the first reset command signal at the first input of the synchronizer and the second input of the synchronizer is based at least in part on generating the first reset command signal at the flip-flop.

6. The method of claim 2, wherein:

the first reset command signal at the second input further includes a third delay relative to the first reset command signal at the first input, and the third delay is associated with a time duration between the sampler receiving the second clock signal and outputting the third clock signal.

7. The method of claim 4, wherein:

the time duration is further based at least in part on a third delay, and the third delay is associated with a second time duration between the sampler receiving the second clock signal and outputting the third clock signal.

8. An apparatus, comprising:

a receiver configured to receive a data clock signal having a first rate and to generate a second clock signal having a second rate based at least in part on the data clock signal;

a sampler configured to sample a first command/address signal, wherein the sampler is configured to perform the sampling using the second clock signal that includes a first delay associated with communicating the second clock signal to the sampler; and a synchronizer configured to:

receive a second command/address signal output by the sampler and a third clock signal output by the sampler, wherein the second command/address signal and the third clock signal include a second delay associated with communicating signals between the sampler and the synchronizer;

synchronize a first timing of the second clock signal with a second timing of the third clock signal based at least in part on receiving the second command/address signal and the third clock signal; and output a signal comprising the second command/address signal and a synchronized clock signal having the second rate based at least in part on the synchronization.

9. The apparatus of claim 8, wherein the synchronizer is configured to receive a first reset command signal at a first input of the synchronizer and to receive the first reset command signal at a second input of the synchronizer, wherein the first reset command signal at the second input includes at least the first delay and the second delay relative to the first reset command signal at the first input, the synchronizer comprising:

an output counter configured to be reset based at least in part on the synchronizer receiving the first reset command signal at the first input; and an input counter of the synchronizer configured to be reset based at least in part on receiving the first reset command signal at the second input.

10. The apparatus of claim 8, wherein the apparatus is further configured to:

detect that each memory bank is closed; and power down the synchronizer based at least in part on the detecting.

11. The apparatus of claim 8, wherein the first timing of the second clock signal and the second timing of the third clock signal differ by a time duration based at least in part on the first delay and the second delay.

12. The apparatus of claim 9, wherein the apparatus further comprises:

a flip-flop configured to receive a second reset command signal from the sampler and to generate the first reset command signal based at least in part on the second reset command signal, wherein the synchronizer is configured to receive the first reset command signal at the first input and the second input based at least in part on the first reset command signal.

13. The apparatus of claim 9, wherein:

the first reset command signal at the second input further includes a third delay relative to the first reset command signal at the first input, and the third delay is associated with a time duration between the sampler receiving the second clock signal and outputting the third clock signal.

14. The apparatus of claim 11, wherein:

the time duration is further based at least in part on a third delay, and the third delay is associated with a second time duration between the sampler receiving the second clock signal and outputting the third clock signal.

15. A memory device, comprising:

a synchronizer configured to:

receive a second clock signal having a second rate based at least in part on a data clock signal that has a first rate;

receive a command signal output by a sampler and a third clock signal output by the sampler, wherein the command signal and the third clock signal include a delay associated with communicating signals between the sampler and the synchronizer;

synchronize a first timing of the second clock signal with a second timing of the third clock signal based at least in part on receiving the command signal and the third clock signal; and output a signal comprising the command signal and a synchronized clock signal having the second rate based at least in part on the synchronization.

16. The memory device of claim 15, wherein the synchronizer is further configured to:

receive, at a first input of the synchronizer, a first reset command signal;

reset an output counter of the synchronizer based at least in part on receiving the first reset command signal at the first input;

receive, at a second input of the synchronizer, the first reset command signal, wherein the first reset command signal at the second input includes at least the delay relative to the first reset command signal at the first input; and reset an input counter of the synchronizer based at least in part on receiving the first reset command signal at the second input.

17. The memory device of claim 15, wherein the synchronizer is further configured to:

power down when each memory bank associated with the memory device is closed.

18. The memory device of claim 15, wherein the first timing of the second clock signal and the second timing of the third clock signal differ by a time duration based at least in part on the delay.

19. The memory device of claim 16, wherein the first reset command signal at the second input further includes a second delay associated with communicating the second clock signal to the sampler and a third delay associated with a time duration between the sampler receiving the second clock signal and outputting the third clock signal.

20. The memory device of claim 18, wherein the time duration is further based at least in part on a second delay associated with communicating the second clock signal to the sampler and a third delay associated with a second time duration between the sampler receiving the second clock signal and outputting the third clock signal.

* * * * *